United States Patent
Yaguchi et al.

(10) Patent No.: US 6,762,220 B1
(45) Date of Patent: Jul. 13, 2004

(54) CEMENT ADDITIVE

(75) Inventors: Minoru Yaguchi, Chigasaki (JP);
Hidenori Nagamine, Chigasaki (JP);
Keita Kanei, Chigasaki (JP)

(73) Assignee: MBT Holding AG, Trostberg (DE)

( * ) Notice: Subject to any disclaimer, the term of this patent is extended or adjusted under 35 U.S.C. 154(b) by 0 days.

(21) Appl. No.: 09/889,193

(22) PCT Filed: Feb. 15, 2000

(86) PCT No.: PCT/EP00/01257

§ 371 (c)(1),
(2), (4) Date: Nov. 5, 2001

(87) PCT Pub. No.: WO00/48961

PCT Pub. Date: Aug. 24, 2000

(30) Foreign Application Priority Data

Feb. 15, 1999 (JP) ............................................. 11-35350

(51) Int. Cl.[7] .......................... C04B 24/24; C04B 24/28; C04B 24/32; C08F 120/16; C08F 120/06
(52) U.S. Cl. ............................... 524/5; 524/4; 525/408; 526/317.1; 526/318; 526/318.3; 526/318.4; 526/318.41; 526/318.5; 526/319; 526/320
(58) Field of Search .......................... 524/4, 5; 525/408; 526/317.1, 318, 318.3, 318.4, 318.41, 318.5, 319, 320

(56) References Cited

U.S. PATENT DOCUMENTS 5,707,445 A * 1/1998 Yamato et al. .............. 106/802
5,912,284 A * 6/1999 Hirata et al. .................... 524/5
5,925,184 A * 7/1999 Hirata et al. ................. 106/696
6,087,418 A * 7/2000 Yamashita et al. ............. 524/5
6,165,262 A * 12/2000 Kono et al. .................. 106/802
6,166,112 A * 12/2000 Hirata et al. .................... 524/5
6,174,980 B1 * 1/2001 Hirata et al. ................. 526/320
6,187,841 B1 * 2/2001 Tanaka et al. .................. 524/5
6,239,241 B1 * 5/2001 Yamato et al. .......... 526/318.44
6,294,015 B1 * 9/2001 Yamashita et al. ........... 106/802

FOREIGN PATENT DOCUMENTS

| DE | 41 42 388 A | | 7/1992 |
| EP | 0 792 850 | * | 9/1997 |
| EP | 0 850 894 A | | 7/1998 |
| JP | 167790 | * | 6/1998 |

OTHER PUBLICATIONS

Polymer Science Dictionary, Second Edition, Mark Alger, Chapman & Hall, pp. 32–33, 1997.*

* cited by examiner

*Primary Examiner*—Peter Szekely
(74) *Attorney, Agent, or Firm*—Norris, McLaughlin & Marcus, P.A.

(57) ABSTRACT

A cement additive comprising a polycarboxylic acid type copolymer and/or a salt thereof and a polyalkylene glycol derivative, wherein said polycarboxylic acid type copolymer contains one or more species of copolymers composed of at least an unsaturated polyalkylene glycol type monomer and an unsaturated mono- or dicarboxylic acid type monomer as their monomer components. Concretes in which the additive is used have excellent flow, without significant retarding effect, and a low air entrainment. When used with concrete for steam curing it allows earlier removal of form work.

5 Claims, No Drawings

CEMENT ADDITIVE

This invention relates to a cement additive and more particularly, to a cement additive used to improve the fluidity and appearance of strength of cement slurry, cement paste, mortar and concrete.

Various cement additives comprising polycarboxylic acid type copolymers have been proposed for enhancing the fluidity and flowability of concrete. While this works well for ordinary concretes, it is not so effective when high strength and high durability are required, as such copolymers tend to entrain an excess of air and retard setting.

In relation to pre-formed concrete products, it is strongly desired to decrease the total time spent in a form and to prevent defects when the form is removed. For such products, good appearance is also highly desirable, when the form is removed after steam curing. Various polycarboxylate materials to achieve this have been proposed, but none have been entirely satisfactory, causing such problems as retarded setting and low fluidity.

It has now been found that a cement additive containing a polycarboxylic acid type copolymer and a polyalkylene glycol derivative having a specific molecular structure can alleviate and sometimes completely remove all the above-mentioned problems, by having a high dispersing ability for various concretes, improving and retaining the fluidity of concrete, and also making it possible to increase the strength of pre-formed concrete, such that form removal after steam curing can be carried out relatively early, giving a product with low aeration.

The invention therefore provides a cement additive containing a polycarboxylic acid type copolymer and/or the salts thereof and a polyalkylene glycol derivative, said polycarboxylic acid type copolymer contains at least one species of copolymer, the monomers of which copolymer comprise at least an unsaturated polyalkylene glycol type monomer (A) and an unsaturated mono- or dicarboxylic acid type monomer (B).

The invention also relates to a cement additive, wherein the polycarboxylic acid type copolymers are copolymers which additionally include as monomer components an unsaturated polyalkylene glycol ester type monomer (C) and/or a monomer (D) polymerizable with the above-mentioned monomers (A) and (B), or with the monomers (A), (B) and (C).

The invention further relates to the above-mentioned cement additive, wherein the monomer (A) is a compound according to the general formula (1):

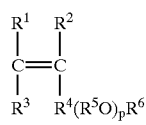

(1 wherein $R^1$, $R^2$ and $R^3$ are each independently hydrogen or methyl, provided that not all are methyl; $R^4$ is —$CH_2O$—, —$(CH_2)_2O$—, —$C(CH_3)_2O$— or —O—; the total carbon number of $R^1$, $R^2$, $R^3$ and $R^4$ is 3; $R^5O$ is one or more species of $C_2$–$C_4$ oxyalkylene groups, and in the case of two or more species may be block or random; $R^6$ is hydrogen or a $C_1$–$C_{22}$ alkyl, phenyl or $C_1$–$C_{18}$ alkylphenyl group; p is an integer from on average 1 to 100;

the monomer (B) is a compound according to the general formula (2):

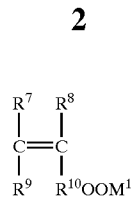

(2 wherein $R^7$ and $R^8$ are each independently hydrogen or methyl; $R^9$ is hydrogen, methyl or —$(CH_2)_qCOOM^2$; $R^{10}$ is —$(CH2)_r$—; q and r are each independently an integer from 0 to 2; $M^1$ and $M^2$ are a monovalent metal, a divalent metal, ammonium or an organic amine;

the monomer (C) is a compound according to the general formula (3):

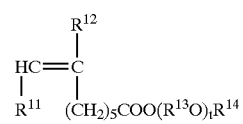

(3 wherein $R^{11}$ and $R^{12}$ are each independently hydrogen, methyl or $(CH_2)_uCOOM^3$, u is an integer from 0 to 2, $M^3$ is a monovalent metal, a divalent metal, ammonium or an organic amine; $R^{13}O$ is one or more species of $C_1$–$C_4$ oxyalkylene groups, and in the case of two or more species may be block or random; $R^{14}$ is hydrogen or a $C_1$–$C_{22}$ alkyl, phenyl or $C_1$–$C_{22}$ alkylphenyl group; s is an integer from 0 to 2; t is an integer an average from 1 to 300; and the monomer (D) is a compound according to the general formula (4):

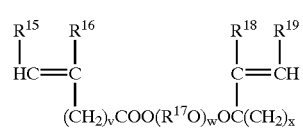

(4 wherein $R^{15}$, $R^{16}$, $R^{18}$ and $R^{19}$ are each independently hydrogen or methyl, provided that not all are methyl, $R^{17}O$ is one or more species of $C_2$–$C_4$ oxyalkylene groups, and in the case of two or more species may be block or random; w is an integer an average from 1 to 300; v and x are each independently an integer from 0 to 2.

The invention also relates to the abovementioned cement additive, wherein the composition ratios of the monomers (A) and (B) in the polycarboxylic acid-type copolymers are 30–100 mole % based on the total mole amount of the monomers, and the average molecular weight of said polycarboxylic acid-type copolymer is from 3,000–100,000 (all molecular weights (MW referred to herein were measured by gel permeation chromatography with polyethylene glycol as standard).

The invention also relates to the abovementioned cement additive, wherein the average molecular weight of the polyalkylene glycol derivatives is from 1,000–100,000, in which the alkylene is one or more $C_2$–$C_4$ species, and the terminal groups of the polyalkylene glycol is hydrogen or a $C_1$–$C_{18}$ is alkyl or phenyl group.

Further, the invention relates to the abovementioned cement additive containing 100 weight parts of the polycarboxylic acid type copolymers and 10–50 weight parts of the polyalkylene glycol derivatives.

Also, the invention relates to the above mentioned cement additive, wherein the amount of the polycarboxylic acid type copolymers added to cement is 0.05–1.0% by weight based on the weight of cement, and the amount of the polyalkylene glycol derivative added to cement is 0.00–0.5% by weight based on the weight of cement.

Further, the invention relates to use of abovementioned cement additive in high strength concrete.

The invention also relates to the use of the abovementioned cement additive in the formation of pre-formed concrete articles by steam curing.

The invention further provides a method of preparation of a high-strength concrete mix, comprising the incorporation in the mix of a cement additive as hereinabove described.

The invention further provides a method of preparing of a concrete mix adapted to be used for the manufacture of articles by steam curing, comprising the incorporation in the mix of a cement additive as hereinabove described.

In a cement additive according to the invention, the monomers (A) are typically compounds according to the abovementioned general form (1), more specifically, the compounds in which 1–100 mole of an alkylene oxide is added to an unsaturated alcohol such as 3-methyl-2-buten-1-ol, 3-methyl-3-buten-1-ol, 2-methyl-3-buten-2-ol. One or more species of unsaturated alcohol may be used.

Examples of monomers (B) include compounds according to general formula (2), more specifically, for example, acrylic acid, methacrylic acid, crotonic acid, maleic acid, fumaric acid, itaconic acid and citraconic acid. One or more species of these may be used.

Monomers (C) are typically compounds according to general formula (3). Specific examples include unsaturated polyalkylene glycol monoester type monomers such as polyethylene glycol monoesters, polypropylene oxide monoesters, monoesters of polyethylene glycol/polypropylene oxide copolymers, derivatives in which a terminal hydrogen of these glycols is etherified, and the like, such as triethylene glycol monoacrylate, polyethylene glycol (MW 200) monoacrylate, polyethylene glycol (MW 400) monoacrylate, polyethylene glycol (MW 600) monoacrylate, polyethylene glycol (MW 1000) monoacrylate, polyethylene glycol (MW 2000) monoacrylate, polyethylene glycol (MW 4000) monoacrylate, polyethylene glycol (MW 6000) monoacrylate, triethylene glycol monomethacrylate, polythylene glycol (MW 200) monomethacrylate, polyethylene glycol (MW 400) monomethacrylate, polyethylene glycol (MW 600) monomethacrylate, polyethylene glycol (MW 1000) monomethacrylate, polyethylene glycol (MW 2000) monomethacrylate, polyethylene glycol (MW 4000) monomethacrylate and polyethylene glycol (MW 6000) monomethacrylate, and one or more species of these may be used.

The monomers (D) are typically compounds according to general formula (4), specific examples including unsaturated polyalkylene glycol diester type monomers and/or styrene, styrenesulfonic acid and/or the salts thereof acrylic acid alkyl esters (alkyl of $C_{22}$ maximum) methacrylic acid alkyl ester (alkyl of $C_{22}$ maximum), maleic anhydride, maleic acid monoesters (akyl of $C_{22}$ maximum), and/or alkylene glycol of $C_3$ maximum and 1–300 alkylene glycol units, maleic acid diester (alkyl of $C_{22}$ maximum and/or alkylene glycol of $C_3$ maximum and 1–300 alkylene glycol units, vinyl acetate, acrylamide and acrylamide methylpropansulfonic acid and/or the salts thereof.

Specific examples include styrene, styrenesulfonic acid and/or the salts thereof, acrylic acid methyl ester, acrylic acid ethyl ester, acrylic acid butyl ester, methacrylic acid methyl ester, methacrylic acid ethyl ester, methacrylic acid butyl ester, maleic anhyride, maleic acid methyl monoester, maleic acid ethyl monoester, maleic acid methyl diester, maleic acid ethyl diester, vinyl acetate, acrylamide, acrylamide methylpropansulfonic acid and/or the salts thereof, methallyl sulfonic acid and/or the salts thereof. One or more species of these may be used.

Specific non-limiting examples of polycarboxylic acid type copolymers are those described in JP, A, H5-306152, JP, A, H6-211949, JP, A, H9-286647 and JP, A, H10-236858.

The composition ratio of the monomers (A) and (B) in the polycarboxylic acid type copolymers in the invention to total amount of the monomers is preferably 30–100 mole %, and the average molecular weight is preferably 3,000–100,000.

In the polyalkylene glycol derivatives of the invention, the average molecular weight is 1,000–150,000, preferably 1,000–100,000, more preferably 4,000–50,000, the alkylene is one or more $C_2$–$C_4$ species, and it may be block or random in the case of 2 or more species, the terminal groups of polyalkylene glycol are hydrogen, $C_{18}$ maximum alkyl or phenyl groups.

In a cement additive of the invention, the preferred proportions are 100 weight parts of polycarboxylic acid type copolymers and 10–50 weight parts of polyalkylene glycol derivatives.

A cement additive of the invention is preferably used in such a quantity that polycarboxylic acid type copolymers are present in the proportion 0.05–1.0% by weight based on cement weight and polyalkylene glycol derivatives are present in the proportion 0.005–0.5% by weight based on cement weight. However, the amount of the cement additive according to the invention to be used can be appropriately determined according to a cement composition used, it basically being the amount which is necessary to attain the desired strength development and improved time to form removal after steam curing, and it is possible that suitable proportions outside these limits may be found.

A cement additive according to the invention may be used for stiff consistency concrete, plastic concrete, high fluidity concrete, high strength concrete, cement paste as generally used, mortar, grout, concrete and the like, although the beneficial effects of the invention are most noticeable in high strength concrete in which the water/cement ratio is low.

A cement additive according to the invention may be mixed, if desired, with other additives to expand its versatility. Typical examples of other additives are conventional water reducing agents (lignosulfonate, oxycarboxylate, polyalkylsulfonate, polycarboxylate), air content-regulating agents, drying shrinkage reducing agents, accelerators, retarders, foaming agents, anti-foaming agents, anti-rust agents, set acceleration agents, high early-strengthening agents, efflorescence-inhibiting agents, bleeding inhibitors, pumping aids, and water-soluble polymers.

A cement additive according to the invention exhibits a high dispersing ability of a degree never obtained by use only of polycarboxylic acid-type copolymers to various concretes such as ordinary concrete, high strength concrete and steam curing concrete. Without restricting the scope of the invention in any way, it is believed that this is the result of a synergistic effect of the polycarboxylic acid type copolymers and the polyalkylene glycol derivatives. It both enhances the fluidity of concrete and maintains this fluidity, thereby making it possible to increase the strength development and decrease the time for form removal after steam curing. The latter is particularly valuable in that it permits economies such as the reduction of time spent in a form used and the reduction of defects in concrete products manufactured in a concrete factory.

The invention is now further illustrated by the following non-limiting examples wherein are used the cement additives containing polycarboxylic acid type copolymers and polyalkylene glycol derivatives according to the invention.

EXAMPLES

The compositions of the polycarboxylic acid type copolymers in the cement additives used in the examples and in the comparative examples are shown in Table 1. Said polycarboxylic acid type copolymers can be obtained by known polymerization methods described in, for example, JP, A, H5-306152, JP, A, H6-211949, JP, A, H9-286647 and JP, A, H10-236858. The polyalkylene glycol derivatives in the cement additives used in the examples and in the comparative examples are also shown in Table 2.

In order to illustrate the effect of these cement additives, the concrete compositions (shown in Table 3) are designed to have slump of 18.5±1 cm and air content 4.5%. The total quantity of materials in each case is 80 liters, and all the materials are added to a 100 liter pan-type forced mixing mixer, and mixed for 120 sec, to give the concrete compositions. The concrete compositions thus obtained are measured for slump, air content, setting time and compressive strength. Further, the compressive strength in the case of accelerating the appearance of strength by steam curing was measured.

1) Slump: measured according to JIS A 1101,
2) Air content: measured according to JIS A 1128,
3) Setting time: measured according to JIS A 6204 Supplement 1,
4) Compressive strength
   Ordinary curing: measured according to JIS A 1108.
   Steam curing: the sample is pre-cured at 20° C. for 2 hr, then warmed to 65° C. in 2 hrs 30 min, kept at 65° C. for 4 hrs. After allowing to cool to 20° C. over 4 hrs, the testing is carried out according to, JIS A 1108.

(Materials Used)
  Mixing water: tap water,
  Cement: ordinary portland cement (density 3.16 g/cm$^3$).
  Fine aggregate: Oi River pit sand (specific gravity 2.59. FM=2.74),
  Coarse aggregate: Oume crushed stone (specific gravity 2.65. MS[median size?]=20 mm).

The results of the above measurement are shown in Table 4. In the Table, the examples 1–13 and the comparative examples 1–4 are for the results obtained from the ordinary cement, and the examples 14, 15 and the comparative examples 5, 6 are those obtained from the high strength concrete.

The examples 1–7 show the cases in which the type of the polycarboxylic acid type copolymers is changed, and the examples 1 and 8–13 are the cases in which the type of the polyalkylene glycol derivatives is changed.

The comparative examples 1 and 5 show the cases in which a polyalkylene glycol derivative is not used, and the comparative examples 2–4 and 6 are the cases in which compounds other than the polycarboxylic acid type copolymers in the invention are used.

As is evident from the comparison between the comparative example 1 and the examples 1–13, and from the comparison between the comparative example 5 and the examples 14 and 15, the ordinary concrete and the high strength concrete, in which the cement additives together with the polyalkylene glycol derivatives of the invention are used, both show a tendency to accelerate setting, whereby the slump values are large (fluidity) and their slump lowering over 60 min is small (high flowability), demonstrating a preferable compressive strength both for ordinary curing and steam curing.

The comparative examples 2–4 and 6 are those in which compounds other than the polycarboxylic acid type copolymers in the invention are used, though in these examples the development of compressive strength is not sufficient, because there is demonstrated a retardation of setting.

TABLE 1

| Type of Polycarboxylic Acid-type copolymer | Monomer (A) | | | Monomer (B) | | | Monomer (C) | | | Monomer (D) | | | Average Molecular Weight |
|---|---|---|---|---|---|---|---|---|---|---|---|---|---|
| | Mole ratio (%) | Type | AG No. | Mole ratio (%) | Type | | Mole ratio (%) | Type | AG No. | Mole ratio (%) | Type | |
| PCA-1 | 1.5 | Polyethylene glycol mono-vinyl ether | 50 | 1 | Maleic acid | | — | — | | — | — | — | 20000 |
| PCA-2 | 1.5 | 2-Methyl 2-propen-1-ol alkylene oxide adduct | 50 | 1 | Maleic acid | | — | — | | — | — | — | 30000 |
| PCA-3 | 1.5 | Polyethylene glycol mono-vinyl ether | 50 | 1 | Maleic acid | | 0.2 | Polyethylene glycol maleic acid ester | 75 | — | — | | 35000 |
| PCA-4 | 1.5 | Polyethylene glycol polypropylene glycol allyl ether | 50 | 1 | Maleic acid | | 0.3 | Polyethylene glycol maleic acid ester | 25 | 0.1 | Maleic anhydride | | 24000 |
| PCA-5 | 1.5 | Polyethylene glycol allyl ether | 12 | 1 | Maleic acid | | — | — | | — | 0.2 | Styrene | 32000 |
| PCA-6 | 1.5 | 2-Methyl 2-propen-1-ol alkylene oxide adduct | 25 | 1 | Acrylic acid | | — | — | | — | 0.2 | Acrylamide methylpropan sulfonic acid | 27000 |
| PCA-7 | 1.5 | 2-Methyl 2-propen-1-ol alkylene oxide adduct | 75 | 1 | Acrylic acid | | — | — | | — | 0.2 | Polyethylene glycol dimethacrylic acid ester | 75000 |
| P-1 | 1 | 2-Methyl 2-propen-1-ol alkylene oxide adduct | 50 | 1 | Maleic acid | | 2 | Polyethylene glycol maleic acid ester | 25 | — | — | | 30000 |

TABLE 1-continued

| Type of Polycar- boxylic Acid-type copolymer | Type of monomer and composition ratio | | | | | | | | | | Average Molecular Weight |
|---|---|---|---|---|---|---|---|---|---|---|---|
| | Monomer (A) | | | Monomer (B) | | Monomer (C) | | | Monomer (D) | | |
| | Mole ratio (%) | Type | AG No. | Mole ratio (%) | Type | Mole ratio (%) | Type | AG No. | Mole ratio (%) | Type | |
| P-2 | 1 | Polyalkylene glycol monovinyl eher | 50 | 1 | Maleic acid | 2 | Polyethylene glycol methacrylic acid ester | 25 | — | — | 28000 |
| P-3 | — | — | — | 1 | Acrylic acid | 2 | Polyethylene glycol methacrylic acid ester | 100 | — | — | 28000 |

TABLE 2

| Sample mark | Component name of polyalkylene glycol | Average molecular weight |
|---|---|---|
| PAG-1 | Polyethylene glycol | 4000 |
| PAG-2 | Polyethylene glycol | 6000 |
| PAG-3 | Polyethylene glycol | 10000 |
| PAG-4 | Polyethylene glycol | 20000 |
| PAG-5 | Polyethylene glycol | 50000 |
| PAG-6 | Polyethylene glycol-polypropylene glycol block polymer | 4000 |
| PAG-7 | Polyethylene glycol oleic acid ester | 5000 |

TABLE 3

| Type of Concrete | W/C (%) | s/a (%) | (Blend) Unit amount (Kg/m$^3$) | | | |
|---|---|---|---|---|---|---|
| | | | W | C | S | G |
| Ordinary Concrete | 50 | 46 | 160 | 320 | 823 | 993 |
| High-strength concrete | 35.6 | 44 | 160 | 450 | 741 | 968 |

TABLE 4

(Concrete test)

| | Type of blend | No. | Polycarboxylic acid type copolymer | | PAG | | Slump (cm) | | Air content (%) | |
|---|---|---|---|---|---|---|---|---|---|---|
| | | | Type | Amount added (wt %) | Type | Amount added (wt %) | Just after | 60 min later | Just after | 60 min later |
| Example | Ordinary Concrete | 1 | PCA-1 | 0.2 | PAG-4 | 0.03 | 19.0 | 15.0 | 4.5 | 4.5 |
| | | 2 | PCA-2 | 0.2 | PAG-4 | 0.03 | 15.5 | 16.0 | 4.4 | 4.4 |
| | | 3 | PCA-3 | 0.2 | PAG-4 | 0.03 | 18.0 | 11.5 | 4.6 | 4.5 |
| | | 4 | PCA-4 | 0.2 | PAG-4 | 0.03 | 18.5 | 19.0 | 4.4 | 4.5 |
| | | 5 | PCA-5 | 0.2 | PAG-4 | 0.03 | 18.0 | 15.0 | 4.4 | 4.3 |
| | | 6 | PCA-6 | 0.2 | PAG-4 | 0.03 | 18.0 | 15.0 | 4.6 | 4.5 |
| | | 7 | PCA-7 | 0.2 | PAG-4 | 0.03 | 18.5 | 18.5 | 4.3 | 4.4 |
| | | 8 | PCA-1 | 0.2 | PAG-1 | 0.05 | 18.0 | 15.0 | 4.2 | 4.3 |
| | | 9 | PCA-1 | 0.2 | PAG-2 | 0.05 | 18.0 | 15.0 | 4.4 | 4.5 |
| | | 10 | PCA-1 | 0.2 | PAG-3 | 0.05 | 18.5 | 15.0 | 4.5 | 4.6 |
| | | 11 | PCA-1 | 0.2 | PAG-5 | 0.05 | 18.0 | 15.0 | 4.5 | 4.3 |
| | | 12 | PCA-1 | 0.2 | PAG-6 | 0.03 | 18.5 | 15.0 | 4.6 | 4.4 |
| | | 13 | PCA-1 | 0.2 | PAG-7 | 0.03 | 18.5 | 15.0 | 4.6 | 4.5 |
| | High Strength Concrete | 14 | PCA-1 | 0.2 | PAG-4 | 0.03 | 19.0 | 15.0 | 4.5 | 4.5 |
| | | 15 | PCA-2 | 0.2 | PAG-4 | 0.03 | 18.5 | 16.0 | 4.4 | 4.4 |
| Comparative Example | Ordinary Concrete | 1 | PCA-1 | 0.3 | — | — | 17.5 | 6.0 | 4.4 | 4.0 |
| | | 2 | P-1 | 0.2 | PAG-4 | 0.05 | 18.5 | 14.5 | 4.3 | 5.7 |
| | | 3 | P-2 | 0.2 | PAG-4 | 0.05 | 19.0 | 13.5 | 4.5 | 5.9 |
| | | 4 | P-3 | 0.2 | PAG-4 | 0.05 | 18.5 | 14.0 | 4.5 | 5.9 |

TABLE 4-continued (Concrete test)

| | | | | | | | | | |
|---|---|---|---|---|---|---|---|---|---|
| High strength concrete | 5 | PCA-1 | 0.3 | — | — | 13.0 | 6.0 | 4.4 | 4.0 |
| | 6 | P-3 | 0.3 | PAG-4 | 0.05 | 18.5 | 14.0 | 4.5 | 5.9 |

| | | | Setting time (min) | | Compressive strength (N/mm²) | |
|---|---|---|---|---|---|---|
| Type of blend | | No. | Start | End | Standard curing age 3 days | steam curing age 7 hrs |
| Example | Ordinary Concrete | 1 | 355 | 450 | 25.0 | 27.6 |
| | | 2 | 350 | 450 | 25.4 | 27.9 |
| | | 3 | 355 | 450 | 25.2 | 27.6 |
| | | 4 | 355 | 460 | 24.5 | 27.1 |
| | | 5 | 355 | 450 | 25.6 | 28.3 |
| | | 6 | 355 | 450 | 25.2 | 27.4 |
| | | 7 | 355 | 450 | 24.1 | 29.2 |
| | | 8 | 355 | 450 | 25.2 | 28.4 |
| | | 9 | 355 | 450 | 25.6 | 28.3 |
| | | 10 | 355 | 450 | 25.4 | 28.3 |
| | | 11 | 355 | 450 | 25.3 | 28.3 |
| | | 12 | 355 | 450 | 26.7 | 28.4 |
| | | 13 | 355 | 450 | 26.7 | 27.1 |
| | High Strength Concrete | 14 | 300 | 395 | 36.4 | 39.1 |
| | | 15 | 305 | 390 | 36.2 | 39.0 |
| Comparative Example | Ordinary Concrete | 1 | 380 | 485 | 20.4 | 23.4 |
| | | 2 | 355 | 450 | 22.4 | 23.5 |
| | | 3 | 355 | 455 | 22.6 | 23.8 |
| | | 4 | 380 | 470 | 22.7 | 23.5 |
| | High strength concrete | 5 | 340 | 495 | 31.0 | 35.2 |
| | | 6 | 350 | 445 | 31.5 | 36.0 |

What is claimed is:

1. A cement additive comprising:
(a) a polycarboxylic acid copolymer and/or a salt thereof and a polyalkylene glycol compound, wherein said polycarboxylic acid copolymer contains at least one species of copolymer derived from at least an unsaturated polyalkylene glycol ether monomer (A) and an unsaturated mono- or dicarboxylic acid monomer (B) as its monomer component; or
(b) a polycarboxylic acid copolymer and/or a salt thereof and a polyalkylene glycol compound, wherein said polycarboxylic acid copolymer contains at least one species of copolymer derived from at least an unsaturated polyalkylene glycol ether monomer (A) and an unsaturated mono- or dicarboxylic acid monomer (B) as its monomer component and said polycarboxylic add copolymer is additionally derived from an unsaturated polyalkylene glycol ester monomer (C) and/or monomer (D), which is copolyermerizable with monomers (A) and (B), or with monomers (A), (B) and (C);
wherein for (a) and (b),
the monomer (A) is a compound according to general formula (1)

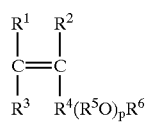

(1)

wherein $R^1$, $R^2$ and $R^3$ are each independently hydrogen or methyl, provided that not all are methyl; $R^4$ is —$CH_2O$—, —$(CH_2)_2O$—, —$C(CH_3)_2O$— or —O—; the total carbon number of $R^1$, $R^2$, $R^3$ and $R^4$ is 3; $R^5O$ is one or more species of $C_2$–$C_4$ oxyalkylene groups, and, in the case of two or more species is optionally block or random; $R^8$ is hydrogen or a $C_1$–$C_{22}$ alky, phenyl or $C_1$–$C_{18}$ alkylphenyl group; p is an integer from on average 1 to 100, the monomer (B) is a compound according to general formula (2):

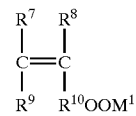

(2)

wherein $R^7$ and $R^8$ are each independently hydrogen or methyl; $R^9$ is hydrogen, methyl or —$(CH_2)_q$COOM²; $R^{10}$ is —$(CH_2)_r$—, q and r are each independently an integer from 0 to 2, $M^1$ and $M^2$ are a monovalent metal, a divalent metal, ammonium or an organic amine;
the monomer (C) is a compound according to general formula (3);

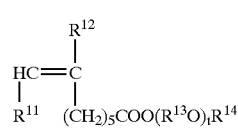

(3)

wherein $R^{11}$ and $R^{12}$ are each independently hydrogen, methyl or $(CH_2)_u$COOM³, u is an integer from 0 to 2, $M^3$ is a monovalent metal, a divalent metal, ammonium or an organic amine; $R^{13}O$ is one or more species of $C_2$–$C_4$ oxyalkylene groups, and, in the case of two or more species, is optionally block or random; $R^{14}$ is a $C_1$–$C_{22}$ hydrogen or an alkyl, phenyl or $C_1$–$C_{22}$ alkylphenyl group; s is an integer from 0 to 2; t is an integer an average from 1 to 300; and the monomer (D) is a compound according to the following general formula (4):

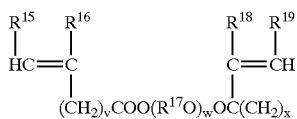

(4)

wherein $R^{15}$, $R^{16}$, $R^{16}$ and $R^{19}$ are each independently hydrogen or methyl, provided that not all are methyl; $R^{17}O$ is one or more species of $C_2$–$C_4$ oxyalkylene groups, and in the case of two or more species, is optionally block or random; w is an integer an average from 1 to 300; v and x are each independently an integer from 0 to 2;

which contains 100 weight parts of polycarboxylic acid copolymer and 10–50 weight parts of polyalkylene glycol in mixing proportion.

2. A high strength concentrate mix, comprising a cement mix and a cement additive according to claim 1.

3. The high strength concrete mix of claim 2, wherein the amount of cement additive is such that the amount of polycarboxylic acid copolymer to cement is 0.05–1.0% by weight based on the weight of cement, and the amount of the polyalkylene glycol to cement is 0.005–0.5% by weight based on the weight of cement.

4. A method of preparation of a high-strength concrete mix, comprising the incorporation into a concrete mix a cement additive according to claim 1.

5. The method of claim 4, wherein the amount of cement additive is such that the amount of polycarboxylic acid copolymer to cement is 0.05–1.0% by weight based on the weight of cement, and the amount of the polyalkylene glycol to cement is 0.005–0.5% by weight based on the weight of cement.

* * * * *